Patented Oct. 31, 1950

2,527,596

UNITED STATES PATENT OFFICE 2,527,596

CARBON BODY AND METHOD OF MAKING

Frederick L. Shea, Jr., Chicago, and Leslie H. Juel, Morton Grove, Ill., assignors to Great Lakes Carbon Corporation, New York, N. Y., a corporation of Delaware No Drawing. Application August 31, 1948, Serial No. 47,156

7 Claims. (Cl. 106—56)

This invention relates to formed carbon articles or structures, amorphous and graphitized, which have improved physical properties particularly as regards a bulk density more nearly approaching the real density of the carbon material than has been attained in commercial practice heretofore. Along with such density improvement, this invention accomplishes an unusual increase in the mechanical strength of the carbon bodies formed, as well as improvements in properties thereof for various uses.

Specifically, this invention is concerned with carbon bodies comprising shaped and heat treated mixtures of bitumen materials, organic nitro compounds, crushed coke carbons, and a carbon black to produce improved carbon bodies by shaping such mixtures and heating the shaped bodies at carbonizing and graphitizing temperatures.

It is an object of the invention to produce the improved carbon bodies for structural and electrical and refractories, electrodes for furnace and electrolytic processes, commutator brushes, porous carbon filters and air.

A further object of this invention is to provide carbon elements and structures, especially in extreme purity and graphitic form having improved density and thermal characteristics, for the control or conduct of nuclear reactions, e. g., the graphite component of an exponential pile producing plutonium from uranium. Formed graphite bodies are being produced for nuclear energy use and because of improved physical properties have been found to surpass all other forms of graphite heretofore known.

It is a further object of this invention to provide improved carbon and graphite igniter elements for fuel mixtures in the generation of power, e. g., stationary steam generators or propulsion engines of various types.

The past practice in making carbon articles has been to mix a crushed massive carbon aggregate comprised of such carbons as calcined petroleum coke, anthracite, graphite, electrode carbon scrap, or the like, with a sufficient amount of pitch to serve as a binder. This mixture is usually made above the melting point of the binder to secure its adequate distribution throughout the carbon aggregate. Small amounts of black oil to serve as a lubricant, especially for extrusion molding of the mixture, may be added shortly before the mixing is completed. The mixture is cooled somewhat to congeal the binder, after which it is then compressed or extruded into the desired shape, then baked to carbonize the binder, after which the baked carbon body may be subjected to higher temperature to graphitize the carbon and the carbonized binder which holds it together.

The physical and electrical properties of carbon articles so produced and hence their performance in use and application to various purposes is limited primarily by the nature of the materials which are employed in making such carbon articles. The controlling physical property of such carbon bodies especially for structural purposes is the degree of density which can be obtained, that is to say, the apparent density has usually been below about 80% of the real density of either the baked carbon or graphitized articles. As a result of this lack of density other properties, such as the mechanical strength and thermal conductivity and porosity have been lacking for the extensive use of carbon for many purposes. As will be described hereinafter it will become clear that the present invention overcomes many of the disadvantages in the products which have been produced up to the present time.

A broad embodiment of the invention comprises preparing a high coking binder from heavy bitumen materials and a nitro substituted organic compound potentially reactive therewith to deposit carbon in the article upon heating above 200° C.; mixing the binder with crushed massive carbon and a carbon black having the characteristics of thermatomic carbon or thermal carbon black commercially produced by high temperature non-oxidizing thermal decomposition of hydrocarbon gases; mechanically shaping the mixture under pressure; baking the shaped mass above 200° C. to completely react the binder components and to carbonize it, thus to obtain an amorphous or non-graphitized carbon body and then impregnating the article with a high coking hydrocarbon, and again carbonizing the article. This embodiment may be further extended wherein the baked carbon body is subjected to graphitizing temperatures to form a substantially graphitized body.

The binder may be prepared by mixing its components at a temperature where one or all of its components are liquid. The temperature should not exceed about 200° C., but preferably be not above 175° C., in order to avoid chemical interaction which is desired during baking but at this point would impair the properties of the binder for mixing with carbon and forming of the shaped bodies prior to baking or carbonization thereof. Under such temperature conditions, in the preparation of the binder, advantage is taken of the solvent properties of the nitro-compound to impart improved viscosity and penetration characteristics to the binder; this is especially desirable for liquifying high melting bitmen materials, e. g., pitch residue obtained by vacuum distillation of ordinary tars and pitches to an end temperature as high as about 350° C.

The prepared binder is then mixed at about 160° C. with specially selected types and proportioned amounts of carbon. The carbon which is to be employed comprises, (1) crushed cokes and other solid carbons, e. g., petroleum coke, pitch cokes, coal coke or anthracite, etc., and (2) a thermal carbon black, the choice of which is dependent upon the use for which the various carbon bodies produced are designed.

Thermal carbon black is a grey, finely divided dry carbon produced by the non-oxidizing thermal dissociation of hydrocarbons such as natural gas at about 1200–1400° C.

There are several distinct types of carbon black. These include thermal or thermatomic carbon black, the combustion blacks such as channel, lamp and furnace blacks and acetylene black produced by explosive combustion of acetylene, depending on process and raw material used.

Of all the various carbon blacks, we have found that thermal carbon black is particularly desirable in combination with crushed massive carbons and our nitro modified binders for producing the improved carbon products of the present invention. The thermal carbon black increases, for example, the density of the formed carbon products. The other carbon blacks do not give the desired improvement or are actually detrimental showing a decrease in the desired properties. A further advantage of thermal carbon black is that it reduces the binder requirements, whereas the other carbon blacks generally increase the binder requirements to get a workable mix. Furthermore, a reduced binder content in the formed carbon body is desirable since this reduces the tendency of the body to swell and become porous or otherwise damaged during the baking or carbonizing step.

The impregnated carbon body after carbonization may be repeatedly impregnated and baked to carbonize the impregnant preferably before subjecting the baked carbon body to a graphitization treatment thus obtaining further improvement in the properties of carbon bodies so produced.

The binder material employed in the practice of this invention is disclosed as subject matter in our copending patent application, Number 681,594 filed July 5, 1946, now Patent No. 2,500,208.

In a specific embodiment of the present invention, the binder material employed is preferably prepared first before mixing with it the carbon components, lubricant, etc. Briefly, the preparation of the binder consists in combining a bitumen material such as coal tar pitch, petroleum pitch or the substantially uncarbonized distillation residues of pitches and tars, with nitro aromatic compounds, e. g. nitro naphthalene, to form about 10% to about 45% of the composite, the preferred proportion being about 15–35%.

The pitch materials which we employ are of coal or petroleum origin, either by distillation or extraction processes, and may also be the by-product pitches from the destructive distillation of wood, other vegetable or organic materials, and the like. They may melt to free-flowing liquids at about 50° C. and higher or may only soften or become plastic up to about 225° C., but preferably such liquifaction or softening which are generally and collectively referred to in the claims as "softening point" should not be above about 200° C. The pitch may contain no benzol insoluble material or it may contain as much as 50–60% or so thereof. The pitch material may contain as much as 65% of constituents vacuum distillable therefrom at, say, 350° C. and 4 m. m. Hg pressure; or may contain no such constituents, e. g., the bottoms from such a vacuum distillation. Again, there are distillation cuts from pitches, particularly in the higher boiling range, for example, the overhead from 270° C. to 350° C. at 4–6 m. m. Hg pressure, which are suitable raw materials for our purposes. Still again, pitch fractions obtainable by solvent extraction or solvent fractionation of pitch materials may also be combined with potentially reactive blending agents for the purposes of our invention.

The nitro aromatic compound may also contain other substituent groups, such as chloro, hydroxy, methoxy, amino, and the like. The nitro compounds employed are those which melt below about 100° C. and boil above about 200° C., being preferably about 80° C. and 225° C. respectively. Examples of the nitro aromatic compounds which we may employ are, the mono- and poly-nitro-benzene, phenol, chlorobenzene, aniline, toluene, xylene, anisole and the like; and nitro substituted diphenyl, naphthalene or other polynuclear aromatics and their derivatives. Those compounds having the melting and boiling point properties indicated are compatible to a high degree with bitumen materials but may vary somewhat as to initial solvent power for various bitumen fractions and the extent of reactivity therewith in subsequent baking of the carbon body made with the composite binder. A preferred compound is alpha nitro naphthalene which functions well in preparation of the binder and produces an increased amount of carbon residue with improved binding strength in the carbon article upon baking.

The proportions of the nitro modified binder and the carbon components all above described, which we have found to give the best improved carbon products follows. The proportions of the binder may be from about 20 to 40 weight parts per 100 weight parts of total carbon to be combined therewith; it is preferably more nearly optimum at about 25–30 parts.

The proportions of the thermal carbon black to the total carbon solids used in the initial mixture, may be from about 5% to 65%, preferably about 10% to about 30%; the coke-type carbons which comprise the remainder of the total carbon solids may be crushed to variously graded particle sizes ranging between about 3/4 inch to particles which will pass a 325 mesh screen.

For purposes requiring, for example, a minimum of porosity minutely distributed in the final product, we have found that the coke type carbon component should have a particle size distribution in which the largest particles preferably do not exceed about 35 mesh size. We have also found that when the coke carbon component contains appreciable proportions of particles larger than about 35 mesh, that the proportions of the carbon black to be employed therewith may be somewhat less to obtain the desired result in the final product.

The coke carbon employed is preferably that which has been heat treated or calcined to a temperature of at least about 700° C. before mixing. In some cases at least a part of such carbon may be graphite or carbon material which has been graphitized by a heat treatment above about 2100° C.

The binder and carbon components may be combined simultaneously in any suitable mixer operating at temperatures sufficient to melt the binder usually at about 150–160° C. but not above a preferred maximum of about 175° C. Mixing time is of the order of 30 to 120 minutes but seldom exceeds 60 minutes. Where the mixture is intended for shaping by extrusion molding, 2 to 3 parts (basis of 100 parts carbon solids) of black oil may be added as a lubricant shortly before the mixing is completed.

The carbonaceous mixture may then be cooled somewhat usually to about 90–160° C., and molded in the usual way, as by pressing in a mold or by extrusion, at pressures up to 5000 p. s. i. or more.

The shaped carbonaceous masses may then be subjected to a baking operation above 200° C. in which the temperature is gradually increased to about 1000° C. to carbonize the binder by the methods and apparatus common to electrode manufacture. The baked carbon bodies may be graphitized by a further heat treatment at graphitizing temperatures above 2400° C. by known means.

In the embodiment of the invention proceeding with a novel combination of materials molded and baked or further graphitized as just described are enabled to produce a completely carbonized or graphitized product having a high apparent density, and which have marked improvement for many purposes over products produced according to the invention of our above mentioned co-pending application.

In order to produce the most effective results, the shaped carbon body should be heat treated to a temperature just sufficient to carbonize the binder and to substantially remove the volatile content wihout causing an appreciable shrinkage of the carbon body to occur. The shaped carbon body should be heat treated to a temperature of at least about 600° C. preferably from about 700° C. to about 800° C., at an upheat rate of not more than about 10° C./hour to secure optimum condition of the carbon body for impregnation.

The impregnating step comprises soaking the baked carbon body with a material such as tar and low melting pitches or resin fractions therefrom which yield large amounts of carbon upon coking, and which are referred to as high coking hydrocarbons. Temperatures for impregnation are such that the impregnant be liquid but below the point at which it begins to decompose, usually between 100° C. and 350° C., the optimum being from about 150° C. to about 250° C. depending on the material. The carbonized body may be impregnated by immersion in the impregnant in a suitable tank at atmospheric to about 200 p. s. i. pressure.

It is preferable, however, to employ a reduced pressure method such as placing the carbon bodies in a closed vessel heated to 150° C. to about 250° C. and to evacuate the pores of the bodies before introducing the impregnant and thereafter restore the pressure to atmospheric or greater. The duration of impregnation may vary from one-half to 60 hours or more depending on the cross section of the piece.

The impregnated pieces are then baked to carbonize the impregnant at an upheat rate of not less than about 5° C./hour to about 1000° C. if a finished carbon body is desired. Alternatively, the impregnated body may be heated at 300–400° C. for about 8–15 hours and then heated at a more rapid rate to bake and graphitize it.

In some cases it is desirable to repeat the impregnation step, usually not more than twice. When this is done, the baking after all except the final impregnation should be carried to a temperature only sufficient to carbonize the impregnant and which may be somewhat lower than for the initial carbonization of the binder in the formed carbon body, preferably between 600° C. and 750° C. After final impregnation the usual finishing heat treatment to 1000° C. and higher are used.

We have found it particularly useful, in many instances, for controlling the reactivity of the foregoing nitro compounds with pitch materials to employ a more or less reactive diluent comprising, such as, the organic chloro compounds, such as, p-chlorophenol, o-, m- and p-chloroaniline, monochlorodiphenyl, dichlorodiphenyl, -chloronaphthalene. The reactivity of the foregoing diluents with pitch materials is generally relatively low compared with that of the nitro compounds described. The use of such diluents with the nitro compounds is to retard early reaction of some of the latter with pitch materials, primarily during the mixing and forming of green carbon bodies. The diluent may also be employed as an additional means for controlling the physical properties of our new binding material comprising pitch materials and the nitro aromatic blending agents. The amount of the diluent which we employ may be from zero to about one part by weight per part of the nitro blending agent, and the amount of blending agent plus diluent will preferably not exceed about 35% by weight of the pitch material. The melting and boiling points of the diluent will be approximately the same as for the nitro aromatic compounds employed.

The examples which follow serve to illustrate the invention but are not to be interpreted in limitation thereof.

*Example I.—Properties of pitch-nitro blending agent composite*

A. Hard pitch from coal tar, melting point 120° C. and coke residue (B-8) 43.4%, was blended as described above with 13% m-dinitrobenzene by weight of the pitch. The coking propensity of the blended composite was 26% greater than that of the pitch alone while the melting point was decreased approximately 15° C. Upon carbonization of the blended composite, a coke residue (B-8) amounting to 54.7% by weight thereof was obtained.

B. Fuel pitch, melting point 152° C. and long coke residue 68%, was blended as described above with 18% α-nitronaphthalene by weight of the pitch to make a composite binding material having good working properties for mixing with carbonaceous solids composed predominantly of coke flour to form green carbon bodies. The melting point of the blended composite was substantially decreased from that of the pitch component to 102° C. and the coking propensity thereof in the green carbon body was increased as indicated by the long coke residue of approximately 70% which was obtained.

C. The acetone extraction residue of a medium coal tar pitch (melting point 88° C., benzol insoluble 23.4%, and long coke residue 63.8%)

amounting to 55% of the pitch and having the properties, melting point 180° C., benzol insoluble 42.6%, was blended with 25% α-nitronaphthalene by weight of the pitch. The resulting blended composite binding material has good working consistency in addition to high coking propensity, the control of which properties is of considerable importance as a means for securing improved carbon articles. This composited binding material had a melting point of 82° C. and a long coke residue of approximately 73%.

D. The bottoms from the high end-point vacuum distillation of various pitches are in general not suitable as binders for the manufacture of carbon articles by the usual practices pertaining thereto because of their high melting points and sometimes an excessive amount of a less soluble or dispersed phase usually associated with such materials. We have found these distillation residues to be desirable raw materials when blended according to the practice of our invention. Binding materials were prepared from the pitch bottoms obtained by vacuum distilling a coal tar pitch (melting point 87° C., benzol insoluble material 23%, long coke residue 60%) to 296° C. endpoint at 5 m. m. Hg pressure. The pitch bottoms amounted to 65% of the original pitch and had the properties, melting point 180° C., benzol insoluble 38%. In addition to the potentially reactive blending agents reported in preceding sections of this example, others are given below which when combined with the pitch bottoms yield blended composite binding materials having easy working consistencies, superior binding power and high coking propensities in coke mixtures therewith to form green carbon articles.

| Sample No. | Blending Agent, Per Cent of Pitch Bottoms | Properties of Blended Binder | |
|---|---|---|---|
| | | Melting Point, °C. | Long Coke Residue, Per Cent |
| D-1 | α-Nitronaphthalene, 12.5<br>poly-Nitroxylene, 12.5 | 126 | 73.8 |
| D-2 | o-Nitrodiphenyl, 33.2 | 102 | 71.4 |

*Example II.—Production of carbon articles*

To 100 parts by weight of divided carbon solids consisting of 75% pulverized calcined petroleum coke flour and 25% of a carbon black was added 27 parts by weight of the binding material described in Example I-C. The carbon and binding material were easily and thoroughly mixed together during 30 minutes at 150° C. in a dough-type mixer. The mixture was cooled somewhat and compressed at 125° C. and 2500 lbs./sq. in. to form green carbon blocks. The resulting blocks were baked in the usual way to carbonize the binder; the carbonized binder residue amounted to 78% by weight of the blended binding material originally present. The baked carbon blocks had an apparent density of 1.80, and electrical resistivity of 0.0023 ohms/cu. in., and a crushing strength of more than 14,000 lbs./sq. in. Such amorphous carbon blocks could be heated above about 2000° C. in the usual graphitizing furnaces and thereby obtain graphitized carbon articles having the apparent density increased to approximately 1.85, electrical resistivity decreased about 10 fold and maintain approximately two-thirds of the high crushing strength of the amorphous state. Such conditions of high density and strength of graphitized articles are not readily attained in the usual practices for producing graphitized carbon articles.

*Example III*

75 parts by weight of calcined petroleum coke flour was added to 25 parts by weight of carbon black. To the resultant mixture there was added 27 parts by weight of a binder consisting of 85 parts by weight of residue from the vacuum distillation of binder pitch of the type described in Example I-D, and 15 parts by weight of A-nitronaphthalene. The binder and carbon mixture were mixed for about 30 minutes at a temperature of about 160° C. in a dough-type mixer. The resultant mixture was extruded to about 145° C. at a pressure between about 8000 and about 10,000 lbs./sq. in. An electrode of convenient size was baked in the usual way in order to carbonize the binder to a maximum temperature of about 1000° C. The baked carbon blacks have an apparent density of about 1.88 and a crushing strength of more than 14,000 pounds per sq. in. The resultant carbon black was then impregnated with a low melting resinous faction obtained by distillation of coal tar pitch by placing the aforesaid carbon black in a chamber, evacuating said chamber to a pressure of about five millimeters of mercury, followed by admitting the aforesaid impregnant into the chamber at a temperature of about 180° C. The resultant impregnated carbon black was then rebaked in accordance with the previously described procedure and the resultant baked product had a density of about 1.90 and a crushing strength of about 19,000 lbs. per sq. in. After graphitizing the baked impregnated carbon body at a temperature up to about 2800° C. the graphitized carbon body had a density of about 1.91 and a crushing strength of about 10,000 lbs. per sq. in. The resistivity of the graphitized product was about 0.0003 ohm per /in.$^3$ This application is a continuation-in-part of our copending applications Serial No. 681,594, filed July 5, 1946, now Patent No. 2,500,208, and Serial No. 682,928, filed July 11, 1946 now abandoned.

We claim:

1. A hard, dense, carbon body having an apparent density of at least 1.80 and resulting from baking at carbonizing temperatures a mixture of a binder and carbon solids, said carbon solids comprising about 5 to about 65% of thermatomic carbon black and about 95 to about 35% of comminuted calcined coke, said binder consisting essentially of pitch melting in the range of about 50° to about 225° C. and about 10 to about 45% of a nitro substituted aromatic compound melting below about 100° C. and boiling above about 225° C., said compound being compatible with said pitch and reactive with said pitch at a temperature above about 200° C.

2. The composition of claim 1 wherein the coke is petroleum coke.

3. A hard, dense, carbon body characterized by low electrical resistance, resulting from baking at graphitizing temperatures a mixture of a binder and carbon solids, said carbon solids comprising about 5 to about 65% of thermatomic carbon black and about 95 to about 35% of comminuted calcined coke, said binder consisting essentially of pitch melting in the range of about 50° to about 225° C. and about 10 to about 45% of a nitro substituted aromatic compound melting below about 100° C. and boiling above about 225° C., said compound being compatible with said pitch and reactive with said pitch at a temperature above about 200° C.

4. The body of claim 3 wherein the coke is petroleum coke.

5. A process for forming shaped carbon bodies which comprises the step of mixing 95 to 35% by weight of comminuted calcined coke with 5 to 65% by weight of thermatomic carbon black, mixing therewith at a temperature below about 175° C. a binder comprising essentially pitch melting in the range of about 50–225° C., and about 10 to about 45% of a nitro substituted aromatic compound melting below about 100° C. and boiling above about 225° C., said compound being compatible with said pitch and reactive therewith at a temperature above about 200° C., then forming the carbon body under pressure and baking the body at a carbonizing temperature above 200° C. to react the pitch with the nitro aromatic compound to deposit carbon in the body.

6. The process of claim 5 wherein the body is baked at a carbonizing temperature.

7. The process of claim 5 wherein the nitro aromatic compound is alphanitronaphthalene.

FREDERICK L. SHEA, JR.
LESLIE H. JUEL.

REFERENCES CITED

The following references are of record in the file of this patent:

UNITED STATES PATENTS

| Number | Name | Date |
| --- | --- | --- |
| 1,037,901 | Hansen | Sept. 10, 1912 |
| 1,215,700 | Pike | Feb. 13, 1917 |
| 1,340,855 | Weiss | May 18, 1920 |
| 1,392,267 | Szarvasy | Sept. 27, 1921 |
| 1,654,046 | Kahl | Dec. 27, 1927 |
| 1,675,674 | Szarvasy | July 3, 1928 |
| 2,270,181 | Cole et al. | Jan. 13, 1942 |
| 2,270,199 | Thrune | Jan. 13, 1942 |